United States Patent [19]
Baykal

[11] Patent Number: 5,775,315
[45] Date of Patent: Jul. 7, 1998

[54] BARBEQUE AND PATIO TABLE COMBINATION

[76] Inventor: Micheal H. Baykal, P.O. Box 5005, Rancho Santa Fe, Calif. 92067

[21] Appl. No.: 735,936

[22] Filed: Oct. 23, 1996

[51] Int. Cl.$^6$ .................................... F24C 1/16
[52] U.S. Cl. ................ 126/25 R; 126/9 R; 126/26
[58] Field of Search ................ 126/25 R, 9 R, 126/26, 242, 243, 245; 108/5; D7/402

[56] References Cited

U.S. PATENT DOCUMENTS

| | | | |
|---|---|---|---|
| 2,094,915 | 10/1937 | Dawson | 126/25 R |
| 2,154,165 | 4/1939 | Huntington | 126/25 R |
| 5,086,752 | 2/1992 | Hait | 126/25 R |
| 5,168,796 | 12/1992 | Porton et al. | 126/25 R |

FOREIGN PATENT DOCUMENTS

| | | | |
|---|---|---|---|
| 2417964 | 10/1979 | France | 126/25 R |
| 2619701 | 3/1989 | France | 126/25 R |

*Primary Examiner*—Carl D. Price
*Attorney, Agent, or Firm*—Henri J.A. Charmasson; John D. Buchaca

[57] ABSTRACT

A patio table and outdoor barbecue combination in which a charcoal pit is positioned in the upper section of a table central, hollow-core pedestal, and can be covered when not in use by a lid flush with the upper surface of the table slab. The cooking griddle, charcoal plate, and ash-collecting bucket are held at successively space-apart levels by the inner wall of the pit-liner which has an inverted frusto-conical shape.

11 Claims, 1 Drawing Sheet

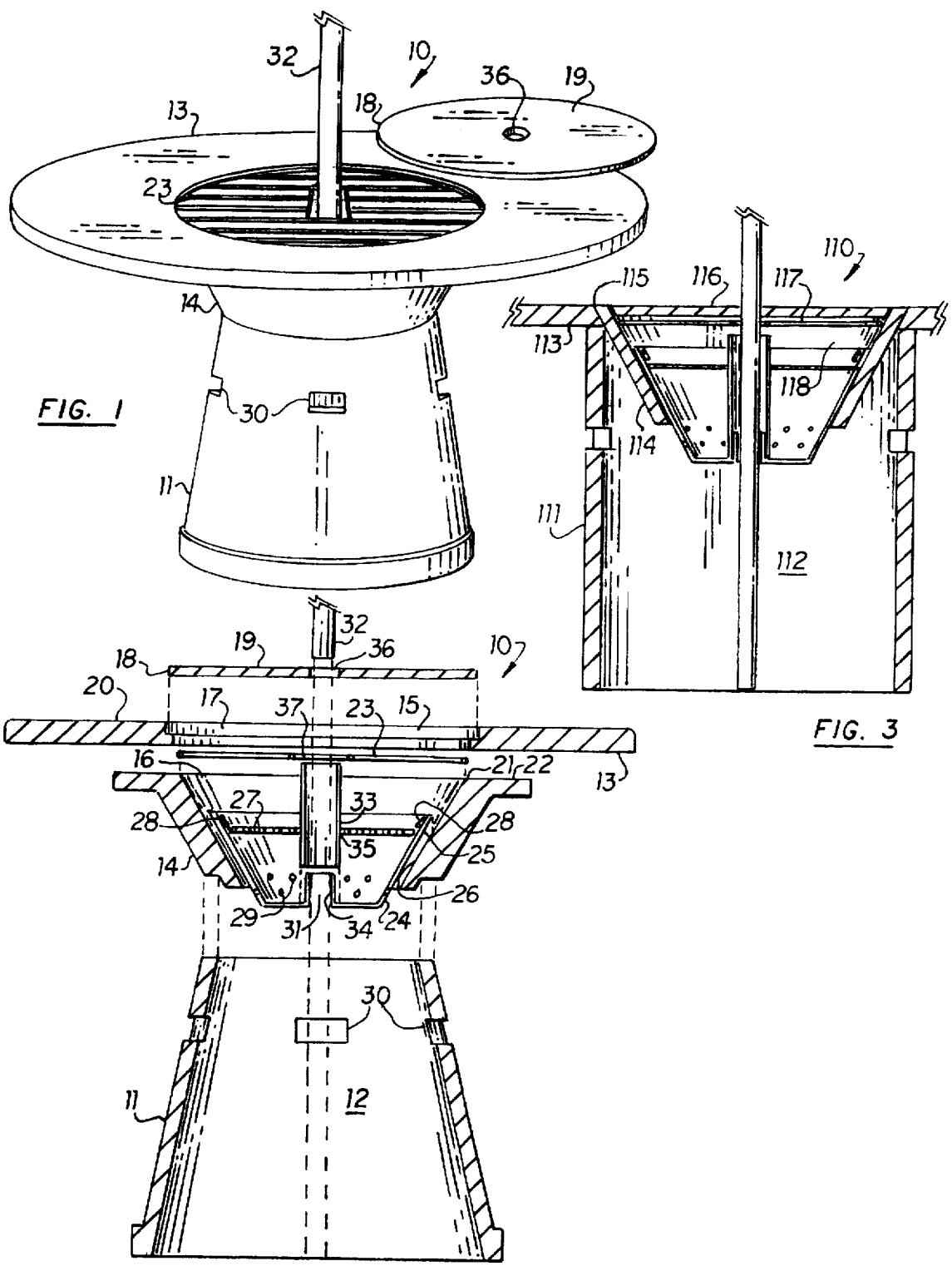

5,775,315

1

BARBEQUE AND PATIO TABLE COMBINATION

FIELD OF THE INVENTION

This invention relates to patio furniture and outdoor cooking installations.

BACKGROUND OF THE INVENTION

Barbecuing structures made of masonry or movable barbecue carts are ubiquitous features of backyards, patios and balconies. On balconies and in certain patios there is often not enough space for a table, chairs and a barbecue.

Barbecue installations are not only bulky but also unsightly and hard to keep clean.

This invention results from an attempt to address the bulkiness, lack of aesthetic and unwieldiness of barbecue installations of the prior art.

SUMMARY OF THE INVENTION

The principal and secondary objects of this invention are to combine a eating table with a cooking grill in an esthetically attractive structure where the cooking elements can be conveniently accessed for easy cleaning.

These and other valuable objects are achieved by a table and barbecue combination in which a charcoal pit is positioned in the upper section of a hollow-core central pedestal of the table, and can be covered when not in use. The inverted frusto-conical shape of the barbecue pit liner allows for a convenient arrangement of the cooking griddle, charcoal plate and ash-collecting bucket where they are held out of sight, but can be quickly removed for cleaning and maintenance.

BREIF DESCRIPTION OF THE DRAWING

FIG. 1 is a perspective view of the preferred embodiment of the invention;

FIG. 2 is an exploded, median, cross-sectional view thereof; and

FIG. 3 is a partial median, cross-sectional view of an alternate embodiment of the invention.

DESCRIPTION OF THE PREFERRED EMBODIMENT OF THE INVENTION

Referring now to the drawing, there is shown a patio table and barbecue combination 10 mage according to the invention. The structure comprises a frusto-conical pedestal 11 having a hollow core 12, a circular table top slab 13, and a pit-liner 14 interposed between the pedestal 11 and slab 13. The pit-liner 14 has the general shape of an inverted conical frustum. The slab 13 has a central void 15 which is slightly larger than the opening 16 at the upper rim of the pit-liner. The rim around the central void of the slab forms a ledge 17 dimensioned to hold the edge of a circular lid 18. When the lid 18 is positioned upon the ledge 17, its top surface 19 lies flush with the top surface 20 of the slab 13. The void 15 in the center of the slab exposes a narrow ridge 21 at the top rim surface 22 of the pit-liner 14 upon which rests the outer edge of a cooking griddle 23. Nested inside the pit-liner 14 is a ash-collecting bucket 24 also having the general shape of an inverted conical frustum. An upper portion 25 of the bucket 24 is retained within the pit-liner by contact of its outer surface which is substantially congruent with an inner, lower surface section 26 of the pit-liner 14. Resting against the inner wall of an upper section of the bucket 24 is a

2 perforated charcoal plate 27. Holding handles 28 are mounted against the inner, upper rim of the bucket 24 to facilitate its extraction from the structure. The bucket 24 has a plurality of venting ports 29 around its lower half. Venting ports 30 are also provided through the upper section of the pedestal 11. A rimmed hole 31 is proved in the center of the bucket bottom. This hole is dimensioned to accommodate the pole 32 of a parasol. A sleeve 33 has its lower end engaged over the rim 34 of the bucket bottom hole 31 and extends upwardly through a central opening 35 in the charcoal plate 27 slightly above the upper rim of the bucket 24. The lid 18 and the cooking griddle 23 also have central holes 36, 37 for engagement by the parasol pole 32. The sleeve 33 and the rim 34 prevent the ashes and grease accumulating at the bottom of the bucket or the charcoal resting on the plate 27 from falling out through the holes 31 of the bucket into the pedestal 11 whether or not the parasol pole 32 is in place.

Although the preferred embodiment above-described is specifically adapted for a charcoal-burning barbecue, it should be understood that a gas-fired grill can easily be implemented within the scope of the invention by using the pedestal as a convenient hiding place for a butane bottle, and installing a gas burner in lieu of the charcoal plate 27.

The pedestal 11 for the table top 13, the lid 18 and the pit-liner 14 are preferably made of masonry material such as a fiber-reinforced cement. The bucket 24, charcoal plate 27, cooking griddle 23 and sleeve 33 are preferably made of metal.

FIG. 3 illustrates an alternate embodiment 110 of the invention in which a cylindrical pedestal 111 with a hollow-core 112 directly supports the table top slab 113, and where the inverted frusto-conical pit-liner 114 is supported by the inner edges of the slab central opening rather than by the pedestal. The lid 116 and the cooking griddle 117 rest against the inwardly slanted inner wall 118 of the pit-liner 114.

All other aspects of this alternate embodiment 110 are similar to the corresponding ones in the earlier described preferred embodiment 10.

While the preferred embodiments of the invention have been described, modifications can be made and other embodiments may be devised without departing from the spirit of the invention and the scope of the appended claims.

What is claimed is:

1. A combination patio table and grill which comprises:

a masonry pit-liner having a peripheral wall, an upper rim opening and a lower rim opening;

a table top slab resting above said pit-liner, said slab having a central void shaped and dimensioned to substantially match said upper rim opening;

a ash-collecting bucket held in a lower section of said pit-liner;

a perforated coal plate held positioned in an upper part of said bucket; and a cooking griddle held in a parallel and spaced-apart position above said coal plate.

2. The structure of claim 1, wherein said pit-liner has an inverted frusto-conical shaped inner peripheral wall surface.

3. A combination patio table and grill which comprises:

a pit-liner having a peripheral wall, an upper rim opening, a lower rim opening and an inverted frusto-conical shaped inner peripheral wall surface;

a table top slab resting above said pit-liner, said slab having a central void shaped and dimensioned to substantially match said upper rim opening;

a perforated coal plate held within said pit-liner;

a cooking griddle held in a parallel and spaced-apart position above said coal plate;

an ash-collecting bucket held by a lower section of said pit-liner near said lower rim opening; and wherein said perforated coal plate is positioned in an upper part of said bucket.

4. The structure of claim 3, wherein said bucket comprises a peripheral wall section having an inverted frusto-conical shape substantially congruent with a portion of said pitliner wall surface.

5. The structure of claim 3 which further comprises a removable lid filling said slab central void.

6. The structure of claim 3 which further comprises a central pedestal supporting said pit-liner and said slab.

7. The structure of claim 6, wherein said pedestal has a hollow core partially engaged by a lower section of said pit-liner.

8. The structure of claim 3, wherein said lid, coal plate, and bucket have central coaxial holes shaped and dimensioned to accept a parasol pole.

9. A combination patio table and grill which comprises:

a pit-liner having a peripheral wall, an upper rim opening and a lower rim opening;

said pit-liner having an inverted frusto-conical shaped inner peripheral wall surface;

a table top slab resting above said pit-liner, said slab having a central void shaped and dimensioned to substantially match said upper rim opening;

a perforated coal plate held within said pit-liner;

a cooking griddle held in a parallel and spaced-apart position above said coal plate;

an ash-collecting bucket held in a lower section of said pit-liner near said lower rim opening;

a central pedestal supporting said pit-liner and said slab;

wherein said pedestal has a hollow core partially engaged by a lower section of said pit-liner; and said bucket and said pedestal have peripheral vent ports.

10. The structure of claim 9, wherein said slab, pit-liner and pedestal are made of masonry material.

11. The structure of claim 9 which further comprises a sleeve lining said plate and bucket central holes.

* * * * *

UNITED STATES PATENT AND TRADEMARK OFFICE
CERTIFICATE OF CORRECTION

PATENT NO. : 5,775,315
DATED : July 7, 1998
INVENTOR(S) : MICHAEL H. BAYKAL

It is certified that error appears in the above-identified patent and that said Letters Patent is hereby corrected as shown below:

In column 1, line 3, add:

Item --[60] This is a continuation-in-part of U.S. Ser. No. 08/058,401, filed on Aug. 14, 1996, which is now U.S. Pat. No. Des 389,009--.

Signed and Sealed this

Tenth Day of August, 1999

Attest:

Q. TODD DICKINSON

Attesting Officer

Acting Commissioner of Patents and Trademarks